United States Patent
Hegde et al.

(10) Patent No.: US 11,728,751 B2
(45) Date of Patent: Aug. 15, 2023

(54) RESYNCHRONIZATION OF BRUSHLESS DC MOTORS

(71) Applicant: TEXAS INSTRUMENTS INCORPORATED, Dallas, TX (US)

(72) Inventors: Ganapathi Hegde, Bengaluru (IN); Prasad Kulkarni, Bengaluru (IN); Venkata Pavan Mahankali, Bangalore (IN); Sameer Pradeep Kulkarni, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 16 days.

(21) Appl. No.: 17/463,349

(22) Filed: Aug. 31, 2021

(65) Prior Publication Data

US 2023/0065597 A1 Mar. 2, 2023

(51) Int. Cl.
*H02P 25/03* (2016.01)
*H02P 6/182* (2016.01)
*H02P 25/026* (2016.01)

(52) U.S. Cl.
CPC ............ *H02P 6/182* (2013.01); *H02P 25/026* (2013.01); *H02P 25/03* (2016.02)

(58) Field of Classification Search
CPC .......... H02P 6/182; H02P 21/18; H02P 27/08; H02P 25/03; H02P 2209/11; H02P 25/026
See application file for complete search history.

(56) References Cited

U.S. PATENT DOCUMENTS 5,245,256 A * 9/1993 Cassat ................. H02P 6/06
388/815
5,384,527 A * 1/1995 Rozman ............... H02P 9/302
318/400.4
(Continued)

FOREIGN PATENT DOCUMENTS

DE 102021110124 A1 10/2021
EP 1998435 B1 7/2013
(Continued)

OTHER PUBLICATIONS

Torres, Daniel et al. "Regenerative Braking of BLDC Motors"; Microchip.
(Continued)

*Primary Examiner* — Thai T Dinh
(74) *Attorney, Agent, or Firm* — Valerie M. Davis; Frank D. Cimino

(57) ABSTRACT

A controller is adapted to be coupled to a brushless direct current (DC) motor and includes an analog-to-digital converter (ADC), a computing device, and a driver. The ADC is configured to receive an analog back electromotive force (BEMF) waveform from the brushless DC motor and sample the analog BEMF waveform to produce a digital BEMF waveform. The computing device is coupled to the ADC and is configured to receive the digital BEMF waveform and determine a position and a speed of the rotor based on the digital BEMF waveform. The driver is coupled to the ADC and the computing device and is configured to receive the position and the speed of the rotor and provide a drive signal based on the position and the speed of the rotor of the brushless DC motor.

19 Claims, 4 Drawing Sheets

(56) References Cited

U.S. PATENT DOCUMENTS

| | | | |
|---|---|---|---|
| 7,030,582 B2* | 4/2006 | Masino | H02P 6/20 318/434 |
| 7,514,887 B2* | 4/2009 | Mullin | H02P 3/08 318/400.11 |
| 9,490,734 B2* | 11/2016 | Nam | H02P 6/10 |
| 10,000,234 B2 | 6/2018 | Kim | |
| 2003/0175018 A1 | 9/2003 | Heydt | |
| 2005/0140329 A1 | 6/2005 | Ihm | |
| 2011/0074327 A1* | 3/2011 | Paintz | H02P 6/182 318/400.35 |
| 2012/0268052 A1* | 10/2012 | Nam | H02P 6/182 318/494 |
| 2014/0062364 A1* | 3/2014 | Petri | H02P 6/182 318/400.34 |
| 2015/0372629 A1* | 12/2015 | Huang | H02P 21/18 318/400.02 |
| 2016/0056740 A1 | 2/2016 | Nondahl et al. | |
| 2017/0063271 A1 | 3/2017 | Murata | |
| 2018/0234043 A1* | 8/2018 | Hustedt | H02P 21/06 |
| 2019/0386592 A1 | 12/2019 | Mogensen | |

FOREIGN PATENT DOCUMENTS

| | | |
|---|---|---|
| EP | 2770626 A1 | 8/2014 |
| JP | 2008220155 A | 9/2008 |
| KR | 1020080085541 A | 9/2008 |
| KR | 101635551 B1 | 7/2016 |

OTHER PUBLICATIONS

Bist, Vashist; "Field Oriented Control (FOC) Made Easy for Brushless DC (BLDC) Motors using TI Smart Gate Drivers"; Application Brief; Texas Instruments; Jan. 2018; SLVA939B.

Infineon; "Sensorless Field Oriented Control with Embedded Power SoC"; Application Note; Mar. 9, 2020; Z8F68474109.

Akin, Bilal et al.; "Sensorless Field Oriented Control of 3-Phase Permanent Magnet Synchronous Motors"; Texas Instruments; C2000 Systems and Applications Team; Mar. 2011; SPRABY9.

Texas Instruments; "Low-Voltage, 50-A Sensorless FOC for Brushless DC or Permanent-Magnet Synchronous Motors Reference Design"; TI Designs TIDM-1003; Jun. 2017; TIDUD29.

Frick, Charles; "Brushless DC Motors Introduction for Next-Generation Missile Actuation Systems Outline"; Analog Devices, Inc.; 2018.

International Search Report in corresponding PCT Application No. PCT/US2022/035204, dated Oct. 21, 2022 (3 pages).

International Search Report in corresponding PCT Application No. PCT/US2022/035460, dated Oct. 26, 2022 (3 pages).

* cited by examiner

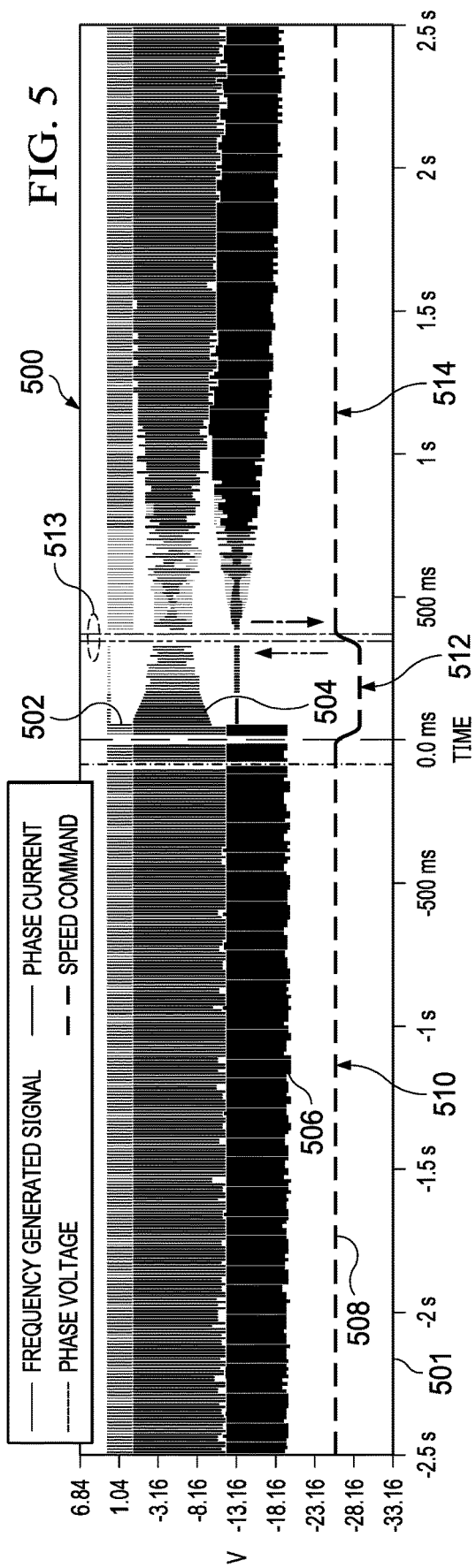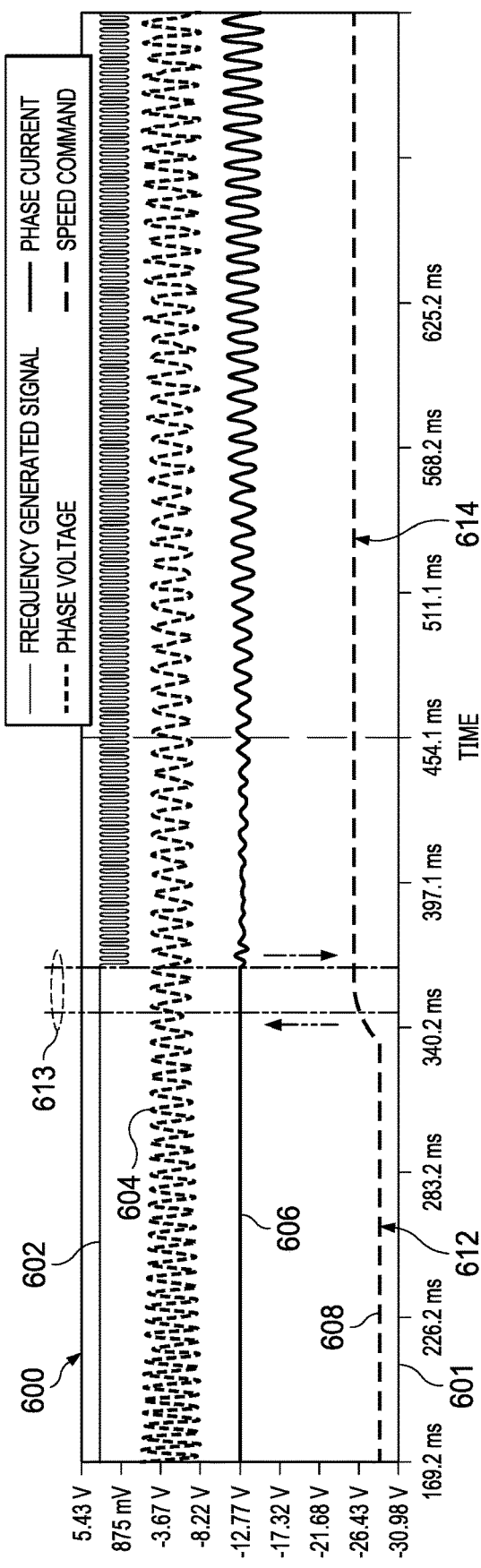

RESYNCHRONIZATION OF BRUSHLESS DC MOTORS

CROSS-REFERENCE TO RELATED APPLICATIONS

Co-pending and co-assigned U.S. patent application Ser. No. 17/364,540 filed on Jun. 30, 2021 and U.S. patent application Ser. No. 17/363,571 filed on Jun. 30, 2021 are hereby incorporated by reference in their entireties.

BACKGROUND

A brushless direct current (DC) motor includes a rotor and a stator and converts electrical energy into mechanical energy. The rotor rotates relative to the stator and may drive a mechanical load such as a shaft. To control the output of the brushless DC motor, the position and the speed of the rotor are used by a controller to generate a drive signal for the brushless DC motor, and the drive signal may be provided to the brushless DC motor.

SUMMARY

In accordance with at least one example of the disclosure, a controller is adapted to be coupled to a brushless DC motor and includes an analog-to-digital converter (ADC), a computing device, and a driver. The ADC is configured to receive an analog back electromotive force (BEMF) waveform from the brushless DC motor and sample the analog BEMF waveform to produce a digital BEMF waveform. The computing device is coupled to the ADC and is configured to receive the digital BEMF waveform and determine a position and a speed of the rotor based on the digital BEMF waveform. The driver is coupled to the ADC and the computing device and is configured to receive the position and the speed of the rotor and provide a drive signal based on the position and the speed of the rotor of the brushless DC motor.

In accordance with another example of the disclosure, a brushless DC motor controller is adapted to be coupled to a brushless DC motor and includes an ADC, a computing device, and a driver. The ADC is configured to receive an analog BEMF waveform from a brushless DC motor and sample the analog BEMF waveform to produce a digital BEMF waveform. The computing device is coupled to the ADC and is configured to transform the digital BEMF waveform to produce a transformed digital BEMF and determine a position and a speed of a rotor of the brushless DC motor based on the transformed digital BEMF waveform. The driver is coupled to the computing device and is configured to produce a drive signal based on the position and the speed of the rotor and provide the drive signal to the brushless DC motor.

In accordance with yet another example of the disclosure, a brushless DC motor includes a voltage sensor, an ADC, and a computing device. The voltage sensor is coupled to the brushless DC motor and is operable to sense an analog BEMF waveform from the brushless DC motor. The ADC is coupled to the voltage sensor and is configured to receive the analog BEMF waveform from the voltage sensor and convert the analog BEMF waveform to a digital BEMF waveform. The computing device is coupled to the ADC and is configured to determine a position and a speed of a rotor based on the digital BEMF waveform.

BRIEF DESCRIPTION OF THE DRAWINGS

For a detailed description of various examples, reference will now be made to the accompanying drawings in which:

FIG. 5 is a graph demonstrating a second resynchronization process of a brushless DC motor in accordance with various examples.

FIG. 6 is a graph demonstrating a third resynchronization process of a brushless DC motor in accordance with various examples.

The same reference numbers or other reference designators are used in the drawings to designate the same or similar (functionally and/or structurally) features.

DETAILED DESCRIPTION

Figure 4:
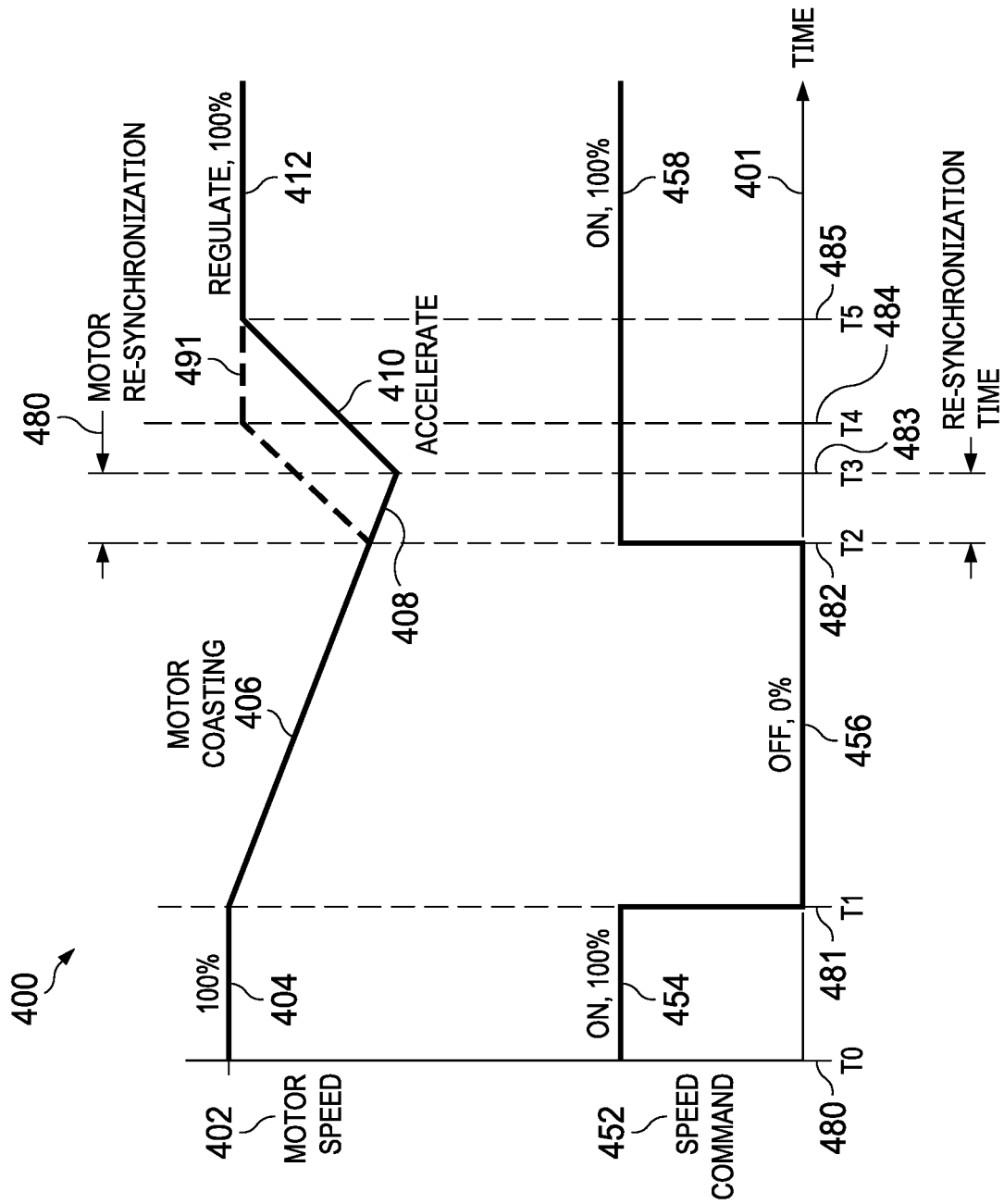
FIG. 4 is a graph demonstrating a first resynchronization process of a brushless DC motor in accordance with various examples.

An initial position and an initial speed of a rotor relative to a stator are needed to control a brushless DC motor. For instance, a brushless DC motor may have one or more phases (e.g., a brushless DC motor may be a three-phase motor). In order to create desired movement of the brushless DC motor, a controller determines which phase needs to be switched on based on the initial position and the initial speed. In at least some situations, a brushless DC motor cannot instantly respond to a control signal (e.g., a speed control signal for the brushless DC motor to rotate at a certain speed), because the brushless DC motor needs to first determine the initial position and the initial speed before the brushless DC motor can be controlled. This causes a delay in responding to the control signal, because the brushless DC motor to first determine the initial position and the initial speed, and then respond to the control signal. The delay in in responding to the control signal may cause an increase in the resynchronization time. An example of a resynchronization process including the resynchronization time is shown in FIG. 4 and described below. For instance, a brushless DC motor may be coasting and receive a control signal to operate at a certain speed. The brushless DC motor may need to determine an initial position and the initial speed of the rotor before controlling the rotor to operate at the certain speed. The time needed between receiving the control signal to operate at the certain speed and operating at the certain speed is an example of a resysnchronation time.

The initial position and the initial speed may be determined by a BEMF. The BEMF may be an electromotive force generated by coils turning inside magnetic fields of the brushless DC motor. Comparators may be used to compare line-to-line voltages of the BEMF, and the comparators are able to detect a speed for every X-degrees (°) (e.g., for every 60 degrees—see FIG. 2 where there are three pairs of coils, each coil 60 degrees apart from another) of rotation as the rotor crosses the stator. Multiple crossings are needed to detect the position and the speed. At lower speeds, 60° of rotation requires a longer amount of time to detect the position and the speed. This longer amount of time increases the amount of time needed to start up and resynchronize the brushless DC motor.

Disclosed herein are examples of a system and a method to rapidly resynchronize a brushless DC motor. For instance, examples may be able to determine an initial position and an initial speed of a rotor, and the initial position and the initial speed of the rotor can be used to control the one or more phases of the brushless DC motor (e.g., the initial position and the initial speed of the rotor may be used to control the commutation of the brushless DC motor). A BEMF may be sampled from a brushless DC motor with an ADC to convert one or more analog waveforms to one or more digital waveforms. The one or more digital waveforms are used by an estimator to estimate the position and the speed of the rotor at the ADC sampling rate. This provides accurate position and speed estimates in reduced time and enables the brushless DC motor to reduce a startup time and to quickly resynchronize a running brushless DC motor.

Figure 1:
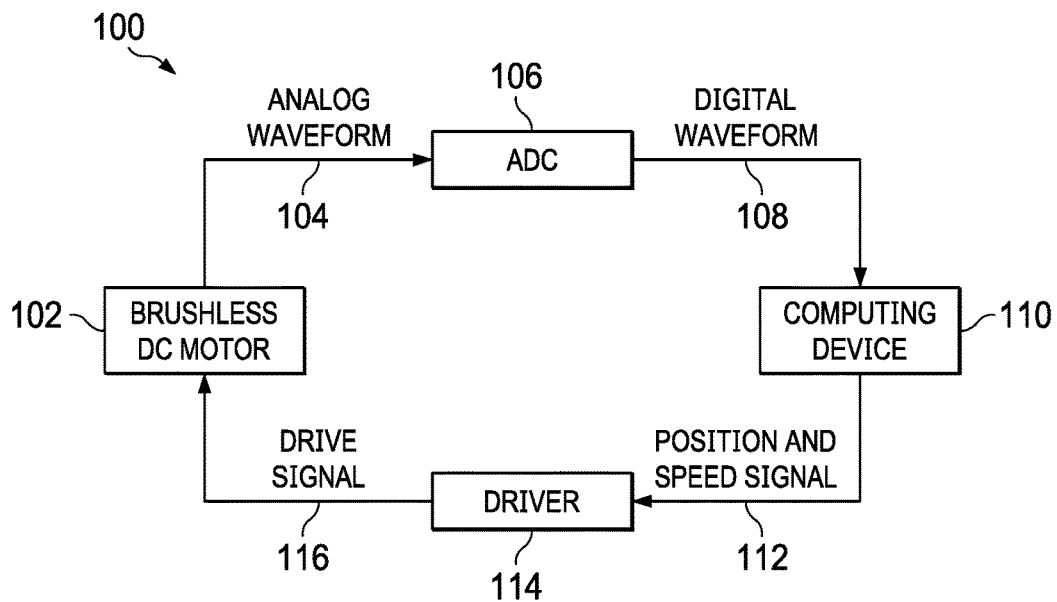
FIG. 1 is a block diagram of a system to resynchronize a brushless DC motor in accordance with various examples.

FIG. 1 is a block diagram of a system 100 to rapidly resynchronize a brushless DC motor 102 in accordance with various examples. In an example, a position and a speed of a rotor in the brushless DC motor 102 are to be determined. Variation of flux linkage across the coils by the rotating magnetic field generates a BEMF represented by an analog waveform 104. For instance, a brushless DC motor 102 may include three pairs of coils. Each pair of coils may be coupled to a voltage source and a voltage sensor. When the brushless DC motor 102 is powered, the voltage source applies a voltage to each pair of coils, sequentially, to produce a current within the coils that causes the rotor of the brushless DC motor 102 to rotate. When the DC motor 102 is not being powered, the continued rotation of the rotor (due to inertia) causes a voltage (the BEMF) to be produced across each pair of the coils. The voltage across each pair of the coils may be measured by the voltage sensor. The voltage sensor outputs the analog waveform 104, which includes values of the magnitude of the voltage across each pair of the coils as a function of time. In some examples, the magnitude of the voltage across each pair of the coils as a function of time may be a sinusoidal waveform, and the sinusoidal waveforms of the three pairs of coils are offset by 120° (360 degrees/3 pairs of coils) to produce a three-phase sinusoidal waveform as the analog waveform 104. However, examples are not limited to any particular type or shape of analog waveform 104 and may include other shapes such as single-phase, two-phase, or three-phase sinusoidal, trapezoidal, or a combination of trapezoidal and sinusoidal waveforms or any other waveforms. The analog waveform 104 may be provided from the brushless DC motor 102 (e.g., by sensing the voltage and/or current in one or more of the three conductors that are connected to each pair of coils) to an ADC 106 and may be sampled by the ADC 106 at a sampling rate to convert the analog waveform 104 into a digital waveform 108. The digital waveform 108 may be provided from the ADC 106 to a computing device 110. The computing device 110 estimates the position and the speed of the rotor in the brushless DC motor 102 based on the digital waveform 108 and produces a position and speed signal 112. The position and the speed signal 112 are provided from the computing device 110 to a driver 114. The driver 114 uses the position and the speed signal 112 to produce a drive signal 116 that may be provided from the driver 114 to the brushless DC motor 102 to drive the brushless DC motor 102. The system 100 produces the position and speed estimates of the signal 112 rapidly relative to conventional solutions, thereby enabling the brushless DC motor 102 to be rapidly resynchronized.

Figure 2:
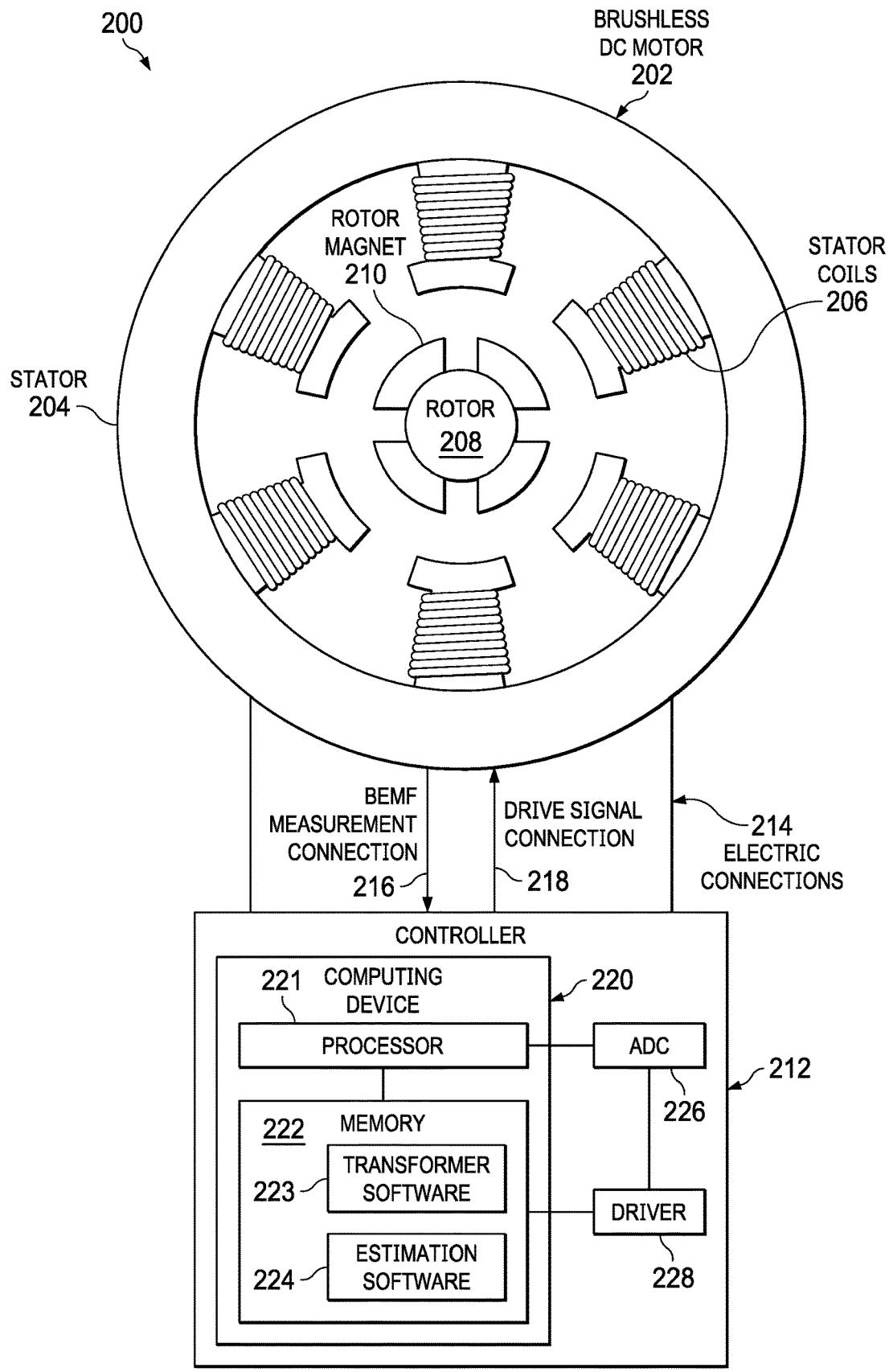
FIG. 2 is a block schematic diagram of a system to resynchronize a brushless DC motor in accordance with various examples.

FIG. 2 is a block diagram of a system 200 to resynchronize a brushless DC motor 202 in accordance with various examples. The brushless DC motor 202 includes a stator 204, and the stator 204 includes one or more pairs of stator coils 206. For instance, the stator 204 may include one, two, three, or four pairs of stator coils 206. Each of the stator coils 206 includes an electromagnet (formed by wrapping one or more wires/coils around a portion of the stator and selectively energizing these wires/coils) but, may instead, include one or more permanent magnets if the rotor does not include a permanent magnet. The stator coil is placed at fixed positions on the stator 204. In the example illustrated in FIG. 2, the stator 204 includes six protrusions and a coil is wrapped around each protrusion to form stator coil 206. The other portion of the coil pair is wrapped around the protrusion that is 180 degrees away from it (thereby resulting in three pairs of coils shown in FIG. 2). Each of the stator coils 206 may include two connection wires or terminals. One of the two connection wires or terminals may be connected to a first terminal of a voltage supply (e.g., a positive terminal or a negative terminal of a voltage supply), and the other one of the two connection wires or terminals may be connected to a second terminal of the voltage supply (e.g., the other one of the positive terminal or the negative terminal of the voltage supply). Also, one of the two connection wires or terminal may be connected to a first terminal of a voltage sensor, and the other one of the two connection wires or terminals may be connected to a second terminal of the voltage sensor. Accordingly, the two connection wires or terminals may be used to apply a voltage to the stator coils 206 and may be used to measure a voltage across the stator coils 206 (e.g., a voltage produced by the BEMF). Additionally, the brushless DC motor 202 includes a rotor 208 and one or more pairs of rotor magnets 210. Each of the rotor magnets 210, as shown in FIG. 2, illustrates one pole of one or more permanent magnets. For example, each of the four instances of rotor magnets 210 illustrate one pole (such as a "North" pole) of a permanent magnet while the other instance of rotor magnet 210 that is 180 degrees way from the North pole is the other pole (such as the "South" pole) of the same permanent magnet. In other example embodiments where the stator coils 206 are implemented using permanent magnets, the rotor magnets 210 are implemented using electromagnets. In an example in which either one or both of the stator 204 and the rotor 208 includes one or more pairs of electromagnets, each pair of electromagnets may be coupled to a voltage source and a voltage sensor. The voltage source provides the voltage applied to each pair of electromagnets when the brushless DC motor 202 is being powered, and the voltage sensor(s) measures the BEMF across each pair of electromagnets when the brushless DC motor 202 is not being powered to produce an analog waveform that includes the BEMF measurements. For instance, the BEMF may be measured by each one of the stator coils 206 between being powered to run the brushless DC motor 202 (e.g., while the brushless DC motor is being commutated), the BEMF may be measured by each one of the stator coils 206 when the brushless DC motor 202 is not being powered (e.g., when the brushless DC motor is not being commutated). When the brushless DC motor 202 is not being powered (e.g., the brushless DC motor 202 is not being commutated and is coasting), the BEMF may be measured continuously, the BEMF may be measured before the position and the speed are need, the BEMF may be measured one a control signal is received, the BEMF may be measured at a same time that a control signal is received, or the BEMF may be measured after a control signal is received. Once the BEMF is measured, the brushless DC motor 202 can determine the position and the speed of the rotor.

The brushless DC motor 202 may be electrically connected to a controller 212 with electrical connections 214.

The electrical connections 214 include a BEMF measurement connection 216 that provides the analog waveform of the BEMF from the brushless DC motor 202 to the controller 212. In some examples, the electrical connections 214 connect the stator coils 206 to a voltage sensor. This allows for the voltage sensor to be able to measure the BEMF sensed by the stator coils 206 and receive the sensed BEMF through the electrical connections 214, which is then measured by the voltage sensor. Also, the electrical connections 214 include a drive signal connection 218 that provides a drive signal from the controller 212 to the brushless DC motor 202. In some examples, the drive signal connection 218 connects the stator coils 206 to a voltage or current source. For instance, the drive signal connection 218 may be a connection between metal-oxide-semiconductor field-effect transistors (MOSFETs) that control switching of a voltage or a current source to a pair of stator coils 206 in the brushless DC motor 202 that may be used to drive the brushless DC motor 202. In some examples, one pair of wires is connected to each pair of the stator coils 206. The one pair of wires may be used to supply the voltage and/or current to the pair of stator coils 206 and to provide the analog waveform of the BEMF sensed by the stator coils 206 from the brushless DC motor 202 to the controller 212.

The controller 212 includes a computing device 220 with a processor 221 and a memory 222. The memory 222 may include transformer software 223 and estimator software 224. The transformer software 223 includes computer-executable instructions stored in the memory 222 that may be executed by the processor 221 to enable the computing device 220 to perform transformation operations. The estimator software 224 includes computer-executable instructions stored in the memory 222 that may be executed by the processor 221 to enable the computing device 220 to perform estimation operations. Additionally, the controller 212 includes an ADC 226 and a driver 228. The ADC 226 receives an analog signal (e.g., the analog waveform of the BEMF from the brushless DC motor 202) and converts it to a digital signal. For instance, an analog signal may include a continuous-time and continuous-amplitude BEMF signal. The analog signal may be a voltage waveform this is measured by the voltage sensor(s) discussed above that are across each pair of the stator coils 206. The analog signal may be obtained by the BEMF produced when the brushless DC motor 202 is not being commutated and the rotor is coasting (e.g., coasting due to inertia). The ADC 226 may convert the continuous-time and continuous-amplitude analog BEMF signal to a discrete-time and discrete-amplitude digital BEMF signal. The driver 228 includes current and/or voltage sources connected through MOSFETs so as to provide power to coils included in the brushless DC motor 202. The MOSFETs (usually there is a high-side MOSFET and a low-side MOSFET for each pair of coils in the DC motor 202) may be switched on/off (using, for example, pulse-width modulation or pulse frequency modulation) to sequentially provide power to the coils to drive the motor.

When the brushless DC motor 202 is running, the driver 228 generates a drive signal that may be provided from the controller 212 to the brushless DC motor 202 through the drive signal connection 218. The drive signal causes the stator coils 206 to energize and create magnetic fields that attract and repel the rotor magnets 210 causing the rotor 208 to rotate relative to the stator 204.

When the brushless DC motor 202 is not running (e.g., the driver 228 is not generating a drive signal to rotate the rotor 208), the rotor 208 may still be rotating relative to the stator 204 due to prior operation of the motor (e.g., inertia from the rotor 208 previously being driven may cause the rotor 208 to continue to be rotating) or due to an external force (such as wind causing a ceiling fan to continue to rotate). In such a case, a BEMF may be generated by the rotor magnets 210 rotating within the stator coils 206. A measurement of the BEMF may be provided from the brushless DC motor 202 to the controller 212 through the BEMF measurement connection 216. The measurement of the BEMF includes an analog waveform of the BEMF. The analog waveform of the BEMF may include any waveform such as, but not limited to, single-phase, two-phase, or three-phase sinusoidal waveforms or single-phase, two-phase, or three-phase trapezoidal waveforms. However, the analog waveforms are not limited to any shape or type of waveform and may include any shape or type of waveform and may include any number of different phases.

The ADC 226 samples the analog waveform of the BEMF at an ADC sampling rate to generate a digital waveform. The ADC sampling rate may be ten times the frequency or more of the analog waveform of the BEMF, and the ADC 226 produces a digital waveform of the BEMF that captures the information included in the analog waveform of the BEMF and that corresponds to the analog waveform of the BEMF. The digital waveform of the BEMF may be provided from the ADC 226 to the processor 221 of the computing device 220.

The computing device 220 performs processing on the digital waveform of the BEMF using the processor 221 and the transformer software 223 to transform the digital waveform into transformed variables. Then, the computing device 220 performs processing on the transformed variables using the processor 221 and the estimator software 224 to estimate a position and a speed of the rotor 208. For instance, the transformer software 223 may cause the computing device 220 (and, more specifically, the processor 221) to reduce a number of variables used to represent the digital waveform. In examples, the transformer software 223 uses a direct-quadrature-zero transformation, a zero-direct-quadrature transformation, a Clarke transformation, a Park transformation, or a combination of the Clarke transformation and the Park transformation. For instance, the computing device 220 may receive a digital waveform of the BEMF that is a representation of a three-phase sinusoidal waveform that includes a voltage A ($V_A$), a voltage B ($V_B$), and a voltage C ($V_C$). The computing device 220 applies the transformer software 223 (using the processor 221) to the digital waveform of the BEMF to transform the three parameters of $V_A$, $V_B$, and the $V_C$ to produce the two parameters of an alpha voltage (Vα) and a beta voltage ($V_\beta$). However, the transformer software 223 is not limited to any particular type of transformation and may perform any transformation that can transform the digital waveform of the BEMF into transformed variables that can be used by the estimator software 224.

The computing device 220 (using the processor 221 and the estimator software 224) performs processing on the transformed variables to estimate a position and a speed of the rotor 208. For instance, the computing device 220 may produce an estimated angle (e.g., position) of the rotor 208 and an estimated angular velocity (e.g., speed) of the rotor 208. In one example, the estimator software 224 receives the two variables Vα and $V_\beta$ and estimates the angle using Equation 1 and estimates angular velocity using Equation 2.

$$\theta = \text{ATAN}\left(\frac{V_\beta}{V_\alpha}\right) \quad \text{Equation 1}$$

$$\text{speed} = \frac{d\theta}{dt} \quad \text{Equation 2}$$

In Equation 1, θ represents the position of the rotor 208 as an angle. The angle may be measured from one of the stator coils 206 being designated as the reference position or 0° angle, and other angles may be measured counterclockwise from the reference position. However, examples are not limited to any particular one of the stator coils 206 being designated as the reference position, and the angles may be measured either counterclockwise or clockwise from the reference position. ATAN represents the arc tangent function. $V_\beta$ represents the voltage beta, and the $V_\alpha$ represents the voltage alpha. In equation 2 above, speed represents the speed of the rotor 208 as an angular velocity, and $$\frac{d\theta}{dt}$$

represents the change in the angular position of the rotor 208 with respect to time. In some examples, the computing device 220 includes a clock or a counter, and the $$\frac{d\theta}{dt}$$

is calculated as the difference between two angles θ divided by the time interval (e.g., two θ's are calculated at different times using Equation 1, and a difference between the two θ's is divided by the time interval between the two different times). However, the estimator software 224 is not limited to any particular processing and may perform any processing that estimates the position and the speed of the rotor 208 from the transformed variables. The estimated position and the speed of the rotor 208 are provided to the driver 228.

The driver 228 performs processing on the position and/or the speed of the rotor 208 (as produced by the processor 221 upon executing the estimator software 224) to produce a drive signal. The drive signal may include an applied voltage (Va). The Va is a voltage applied by the controller to one of the phases of the brushless DC motor. The Va may be determined using Equations 3 and 4 below.

$$Va = (Ke * \text{Speed}) * \cos(\theta) \qquad \text{Equation 3}$$

$$Ke = \frac{Vpeak}{\text{Speed}} \qquad \text{Equation 4}$$

In Equation 3 above, Vα represents the applied voltage. Speed represents the speed of the rotor 208 as an angular velocity, and θ represents the rotor angle. Ke represents a BEMF constant and is calculated using Equation 4 where Vpeak represents the peak voltage (e.g., the peak or highest value of the phase (e.g., the Va or applied voltage that is applied to one of the stator coils 206) to the neutral voltage). For instance, a voltage source that is applied to one of the phases of the brushless DC motor may have a highest or peak value that is applied to the one of the phases of the brushless DC motor. The Vpeak may be the highest value of the applied voltage. The drive signal may be provided from the driver 228 in the controller 212 through the drive signal connection 218 to the brushless DC motor 202. The brushless DC motor 202 uses the drive signal to startup and resynchronize the brushless DC motor 202. For instance, the brushless DC motor 202 may use the drive signal to generate magnetic forces in the stator coils 206.

Figure 3:
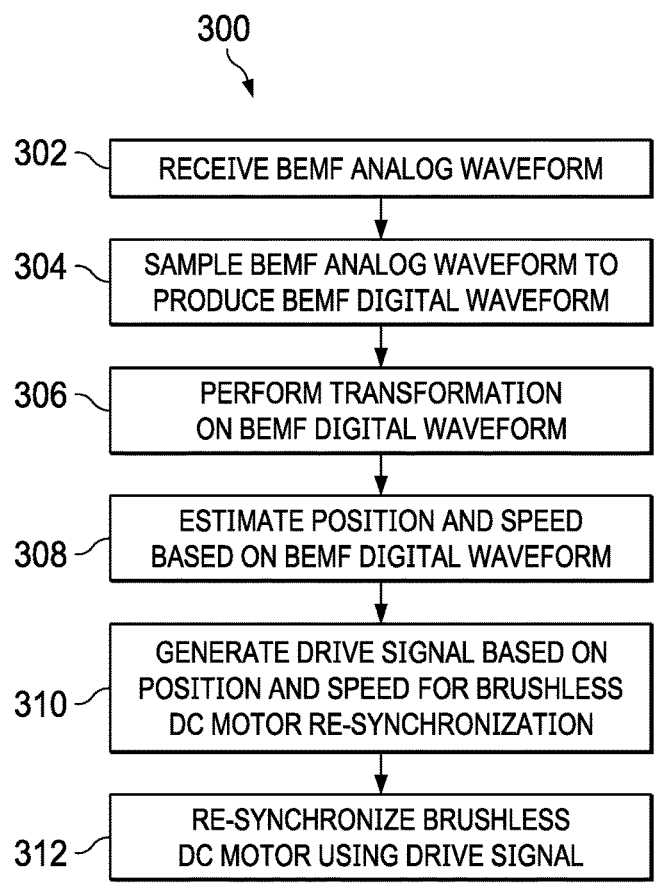
FIG. 3 is a process flow diagram of a method to resynchronize a brushless DC motor in accordance with various examples.

FIG. 3 is a process flow diagram of a method 300 to resynchronize a brushless DC motor system, in accordance with various examples. Method 300 may be performed in an electronic circuit within the brushless DC motor system or in an electronic circuit separate from the brushless DC motor system. At block 302, a BEMF analog waveform may be received from a brushless DC motor. At block 304, the BEMF analog waveform may be sampled to produce a BEMF digital waveform. At block 306, transformation may be performed on the BEMF digital waveform to produce a transformed BEMF digital waveform. At block 308, a position and a speed of a rotor of the brushless DC motor are produced based on the transformed BEMF digital waveform. At block 310, a drive signal may be generated based on the position and the speed of the rotor of the brushless DC motor for brushless DC motor resynchronization. At block 312, the brushless DC motor may be resynchronized using the drive signal.

FIG. 4 is a graph 400 of a first resynchronization process of a brushless DC motor, in accordance with various examples. The graph 400 shows the response of motor speed 402 to a speed command 452. For instance, the speed command 452 may be a command generated or received by a computing device (e.g., a computing device 110 in FIG. 1 or a computing device 220 in FIG. 2). The speed command indicates a desired speed of the brushless DC motor. The desired speed may be represented as a percentage of a maximum speed (e.g., 100% may represent a command of running the brushless DC motor at the maximum speed, and 0% may represent a command of not running the brushless DC motor). The computing device and/or a driver (e.g., a driver 114 in FIG. 1 or a driver 228 in FIG. 2) may use the speed command 452 to generate a drive signal (e.g., a drive signal 116 in FIG. 1). The horizontal or x-axis 401 represents time. The motor speed 402 may be shown by the top waveform in the graph 400 and represents a motor speed as a percentage of the maximum motor speed of a particular motor. For instance, a value of 100% of the motor speed 402 may represent that the motor speed may be at its maximum or highest value of 100%, and a value of 0% of the motor speed 402 represents that the motor speed may be at its minimum or lowest value of 0% (i.e., the motor is not rotating). The speed command 452 may be shown by the bottom waveform in the graph 400 and represents a speed command as a percentage of a maximum speed command of a particular motor. For instance, a value of 100% of the speed command 452 may represent that the speed command may be at its maximum or highest value of 100% (i.e., the speed command is trying to drive the motor to its highest speed), and a value of 0% of the speed command 452 represents that the speed command may be at its minimum or lowest value of 0% (i.e., the speed command is not driving the motor).

In the beginning of the resynchronization process at a first time (T0) 480, the speed command 452 may be at 100% (numeral 454), and the motor speed 402 may be 100% (numeral 404). Then at a second time (T1) 481, the speed command 452 may be switched to 0% (i.e., off) (numeral 456), and the motor speed 402 decreases in a motor coasting state (numeral 406). At a third time (T2) 482, the speed command 452 may be switched back to 100% (numeral 458). However, the motor speed 402 does not instantly begin to increase (numeral 408). Instead beginning at the T2 482, the motor speed 402 continues to decrease for a time period (numeral 408) (e.g., from the T2 482 to a fourth time (T3) 483). The time period where the motor speed 402 continues to decrease while the speed command 452 may be 100% is the motor resynchronization time 480. During the motor resynchronization time 480, the position and the speed of the rotor of the brushless DC motor are determined to begin controlling the brushless DC motor again. The systems and methods shown in and described with reference to FIGS. 1-3 may be used to determine the position and the speed of the rotor. Additionally, in at least some circumstances, the systems and the methods shown in FIGS. 1-3 and described above may reduce the motor resynchronization time 480. After the motor resynchronization time 480 beginning at the T3 483, the motor speed 402 begins to accelerate (numeral 410) until the motor speed 402 returns to 100% (numeral 412) at a sixth time (T5) 485.

Additionally, FIG. 4 shows an ideal motor speed response 491 (e.g., shown by the dashed line in FIG. 4). The ideal motor speed response 491 does not include a resynchronization time 480. For instance, the ideal motor response 491 begins increasing in speed at the T2 481 when the speed command 452 returns to 100%. The ideal motor speed response 491 then reaches 100% speed at a fifth time (T4) 484. Accordingly, the ideal motor speed response 491 illustrates a case in which no time is needed to determine the position and the speed of the rotor. In some examples of the present disclosure, a motor speed response is improved by reducing the motor resynchronization time 480 such that the motor speed response is more similar to the ideal motor speed response 491.

FIG. 5 is a graph 500 of a second resynchronization process of a brushless DC motor, in accordance with various examples. The graph 500 shows the response of a frequency generated signal 502, a phase voltage 504, and a phase current 506 to a speed command 508. The horizontal or x-axis 501 represents time. The frequency generated signal 502 represents the frequency of rotation of a rotor of the brushless DC motor when the brushless DC motor is being driven. The phase voltage 504 represents a voltage across a pair of coils of the brushless DC motor. The phase current 506 represents a current running through the pair of coils of the brushless DC motor, and the speed command 508 represents a speed command as a percentage of a maximum speed command of the brushless DC motor. In the beginning of the second resynchronization process, the speed command 508 may be 100% (numeral 510), and the frequency generated signal 502, the phase voltage 504, and the phase current 506 are at their maximum values. Then, the speed command 508 may be switched to 0% (numeral 512). The phase current 506 goes to zero indicating that no current may be running through the coils, and the frequency generated signal 502 goes to zero indicating that the rotor is no longer being driven. The rotation of the rotor of the brushless DC motor decreases as the rotor is no longer being driven and may be coasting. Accordingly, the phase voltage 504 decreases as less voltage (e.g., the BEMF) is being produced by the rotor continuing to rotate and a back-wards current flowing back to the controller. Finally, the speed command 508 may be switched to 100% (numeral 514). The phase voltage 504 and the phase current 506 begin to gradually increase and return to their maximum values as the rotor of the brushless DC motor is being driven and returns to full speed. The frequency generated signal 502 goes from zero indicating that the rotor is not being driven to its maximum value indicating that the motor is being driven. Additionally, FIG. 5 shows that the second resynchronization process includes a motor resynchronization time 513. The motor resynchronization time 513 corresponds to a delay between the speed command 508 being switched from 0% to 100% and the rotor of the brushless DC motor being driven as indicated by the frequency generated signal 502 returning to its maximum value. As described above, the systems and methods shown in FIGS. 1-3 and described above may reduce the motor resynchronization time 513 by reducing the amount of time needed to determine the position and the speed of the rotor. In one example, the brushless DC motor may be a 12 volt brushless DC motor that resynchronizes at a speed of 130 Hertz with a motor resynchronization time 513 of 18 milliseconds. In conventional solutions, a 12 volt brushless DC motor resynchronizes at a speed of 31 Hertz with a motor resynchronization time of 100 milliseconds.

FIG. 6 is a graph 600 of a third resynchronization process of a brushless DC motor, in accordance with various examples. In an example, the third resynchronization process corresponds to the second resynchronization process shown in FIG. 5, but shows a shorter time duration to highlight additional details of the third resynchronization process. The graph 600 shows the response of a frequency generated signal 602, a phase voltage 604, and a phase current 606 to a speed command 608. The horizontal or x-axis 601 represents time. The frequency generated signal 602 represents the frequency of rotation of a rotor of the brushless DC motor when the brushless DC motor is being driven. The phase voltage 604 represents a voltage across a pair of coils of the brushless DC motor. The phase current 606 represents a current running through a pair of coils of the brushless DC motor, and the speed command 608 represents a speed command as a percentage of a maximum speed command of the brushless DC motor. In the beginning of the third resynchronization process, the speed command 608 may be 0% (numeral 612), and the rotor of the brushless DC motor may be coasting. The frequency generated signal 602 and the phase current 606 are zero indicating that the brushless DC motor is not being driven, and the phase voltage 604 may be decreasing indicating that the rotor speed may be decreasing as the rotor may be coasting. Then, the speed command 608 may be switched to 100% (numeral 613). The time period corresponding to numeral 613 may be the motor resynchronization time 613. As can be seen in FIG. 6, at the beginning of the motor resynchronization time 613, the speed command 608 goes to 100%. However, the frequency generated signal 602 does not immediately return to its maximum value indicating that the motor is being driven. Instead, the brushless DC motor requires the resynchronization time 613 to resynchronize the brushless DC motor as indicated by the resynchronization time 613 between the speed command 608 going to 100% and the frequency generated signal 602 returning to its maximum value. Finally, the brushless DC motor may be resynchronized (numeral 614). The frequency generated signal 602, the phase voltage 604, the phase current 606, and the speed command 608 return to their maximum values as the rotor of the brushless DC motor is being driven and returns to full speed. As described above, the systems and methods shown in FIGS. 1-3 and described above may reduce the motor resynchronization time 613 by reducing the amount of time needed to determine the position and the speed of the rotor.

The terms "connection" and "couple" are used throughout the specification. The terms may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit, device, computing device, or a component device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component. While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g., NPN or PNP), insulated gate bipolar transistors (IGBTs), and/or junction field effect transistor (JFET) may be used in place of or in conjunction with the devices disclosed herein. While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g., NPN or PNP), insulated gate bipolar transistors (IGBTs), and/or junction field effect transistor (JFET) may be used in place of or in conjunction with the devices disclosed herein. Uses of the phrase "ground" in the foregoing description include a chassis ground, an Earth ground, a floating ground, a virtual ground, a digital ground, a common ground, and/or any other form of ground connection applicable to, or suitable for, the teachings of this description. While the example embodiments may suggest that certain elements are included in an integrated circuit while other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Unless otherwise stated, "about," "approximately," or "substantially" preceding a value means+/−10 percent of the stated value. Modifications are possible in the described examples, and other examples are possible within the scope of the claims.

What is claimed is:

1. A controller adapted to be coupled to a brushless direct current (DC) motor and comprising:
    an analog-to-digital converter (ADC) configured to:
        receive an analog back electromotive force (BEMF) waveform from the brushless DC motor; and
        sample the analog BEMF waveform to produce a digital BEMF waveform;
    a computing device coupled to the ADC configured to:
        receive the digital BEMF waveform;
        transform the digital BEMF waveform to produce a transformed digital BEMF waveform; and
        determine a position and a speed of a rotor based on the transformed digital BEMF waveform; and
    a driver coupled to the ADC and the computing device and configured to:
        receive the position and the speed of the rotor; and
        provide a drive signal based on the position and the speed of the rotor of the brushless DC motor.

2. The controller of claim 1, wherein the computing device is configured to perform the transformation on the digital BEMF waveform to produce the transformed digital BEMF waveform by reducing a number of variables used to represent the analog BEMF waveform.

3. The controller of claim 1, wherein the computing device is configured to determine the position and the speed of the rotor using the equations:

$$\theta = \mathrm{ATAN}\left(\frac{V_\beta}{V_\alpha}\right); \text{ and}$$

$$\mathrm{speed} = \frac{d\theta}{dt},$$

wherein θ represents the position of the rotor,
wherein $V_\beta$ represents a beta voltage,
wherein $V_\alpha$ represents an alpha voltage,
wherein speed represents the speed of the rotor, and
wherein $$\frac{d\theta}{dt}$$

represents a change in the position of the rotor with respect to time.

4. The controller of claim 1, wherein the analog BEMF waveform comprises a sinusoidal waveform.

5. The controller of claim 4, wherein the sinusoidal waveform comprises a three-phase waveform.

6. The controller of claim 1, wherein the analog BEMF waveform comprises a trapezoidal waveform.

7. The controller of claim 1, wherein the drive signal comprises an applied voltage (Va) that is calculated using the equations:

$$Va = (Ke * \text{speed}) * \cos(\theta); \text{ and}$$

$$Ke = \frac{Vpeak}{\text{Speed}},$$

wherein Va represents the applied voltage,
wherein Ke represents a brushless DC motor constant,
wherein θ represents a rotor angle,
wherein speed represents the speed of the rotor as an angular velocity, and
wherein Vpeak represents a peak voltage.

8. A brushless direct current (DC) motor controller adapted to be coupled to a brushless DC motor and comprising:
an analog-to-digital converter (ADC) configured to:
receive an analog back electromotive force (BEMF) waveform from the brushless DC motor; and
sample the analog BEMF waveform to produce a digital BEMF waveform;
a computing device coupled to the ADC and configured to:
transform the digital BEMF waveform to produce a transformed digital BEMF waveform; and
determine a position and a speed of a rotor of the brushless DC motor based on the transformed digital BEMF waveform; and
a driver coupled to the computing device and the ADC and configured to:
produce a drive signal based on the position and the speed of the rotor; and
provide the drive signal to the brushless DC motor.

9. The brushless DC motor controller of claim 8, wherein the analog BEMF waveform comprises a sinusoidal waveform.

10. The brushless DC motor controller of claim 9, wherein the sinusoidal waveform comprises a three-phase waveform.

11. The brushless DC motor controller of claim 8, wherein the analog BEMF waveform comprises a trapezoidal waveform or a combination of a trapezoidal and sinusoidal waveform.

12. The brushless DC motor controller of claim 8, wherein the computing device is configured to perform the processing on the digital BEMF waveform to produce the transformed digital BEMF waveform using a direct-quadrature-zero transformation.

13. The brushless DC motor controller of claim 8, wherein the computing device is configured to transform the digital BEMF waveform to produce the transformed digital BEMF waveform using a zero-direct-quadrature transformation.

14. The brushless DC motor controller of claim 8, wherein the computing device is configured to transform the digital BEMF waveform to produce the transformed digital BEMF waveform using a Clarke transformation.

15. The brushless DC motor controller of claim 8, wherein the computing device is configured to transform the digital BEMF waveform to produce the transformed digital BEMF waveform using a Park transformation.

16. The brushless DC motor controller of claim 8, wherein the computing device is configured to transform the digital BEMF waveform to produce the transformed digital BEMF waveform using a combination of a Clarke transformation and a Park transformation.

17. A brushless direct current (DC) motor, comprising:
a voltage sensor coupled to the brushless DC motor and operable to sense an analog back electromotive force (BEMF) waveform from the brushless DC motor;
an analog-to-digital converter (ADC) coupled to the voltage sensor and configured to:
receive the analog BEMF waveform from the voltage sensor; and
convert the analog BEMF waveform to a digital BEMF waveform; and
a computing device coupled to the ADC and configured to:
transform the digital BEMF waveform to produce a transformed digital BEMP waveform; and
determine a position and a speed of a rotor based on the transformed digital BEMF waveform.

18. The brushless DC motor of claim 17, further comprising a driver configured to:
receive the position and the speed of the rotor; and
produce a drive signal based on the position and the speed of the rotor.

19. The brushless DC motor of claim 17, wherein the analog BEMF waveform comprises a three-phase sinusoidal waveform.

* * * * *